Figure 1:
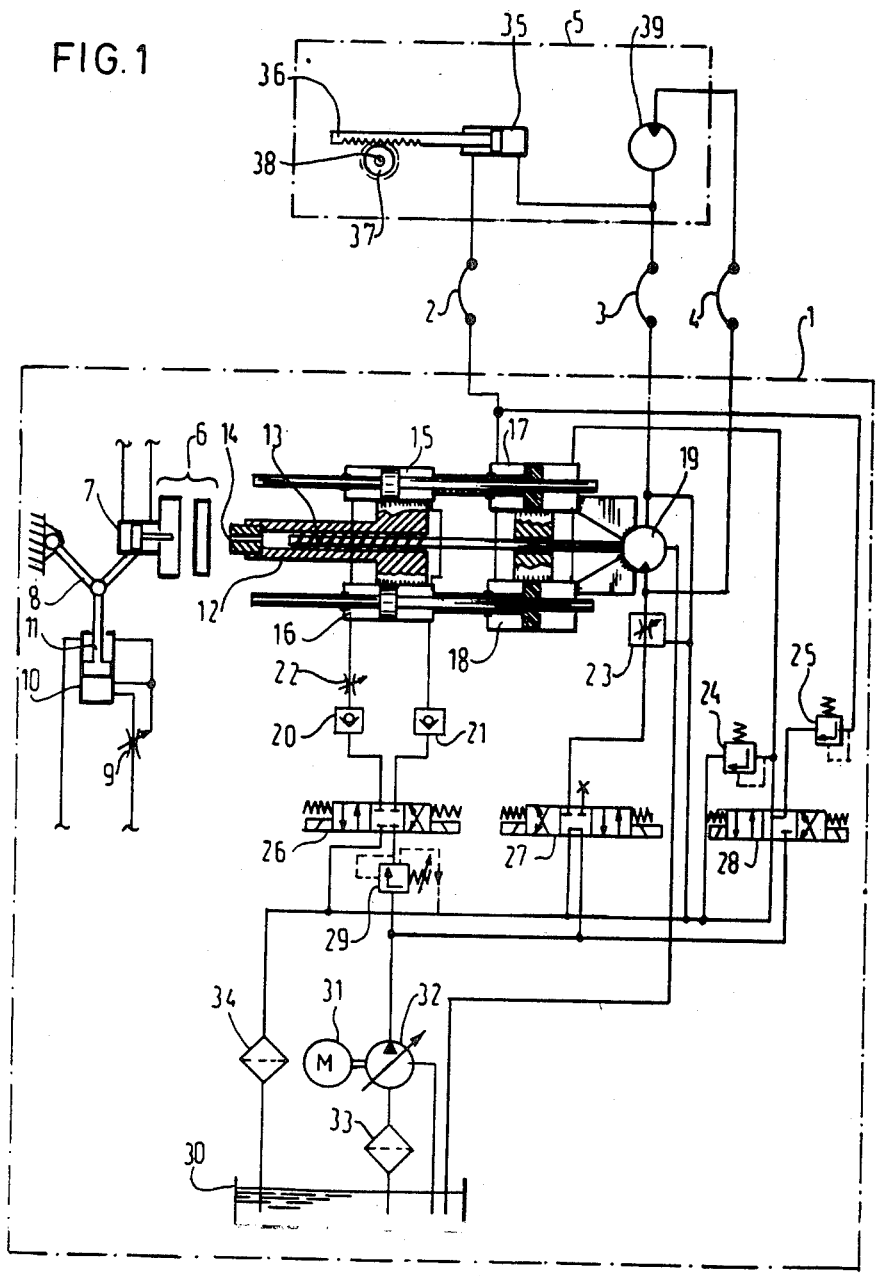

United States Patent [19]

Ter Beek et al.

[11] Patent Number: 4,715,724

[45] Date of Patent: Dec. 29, 1987

[54] HEAD ATTACHMENT FOR A HYDRAULIC SYNTHETIC-RESIN WORKING MACHINE FOR COLORED SYNTHETIC RESIN

[76] Inventors: Gerrit J. Ter Beek, No. 61a Binnenhavenstraat, 7553 GH Hengelo; Albertus Ter Beek, No. 5, Palfijnstraat, 7555 MP Hengelo, both of Netherlands

[21] Appl. No.: 303,928

[22] Filed: Sep. 21, 1981

[30] Foreign Application Priority Data

Sep. 22, 1980 [NL] Netherlands .......................... 8005275

[51] Int. Cl.[4] .............................................. B01F 15/02
[52] U.S. Cl. ..................................... 366/157; 366/183; 74/89.17
[58] Field of Search ...................... 366/27, 38, 76, 150, 366/154, 155, 156, 157, 158, 161, 177, 14, 15, 33, 35, 173, 181, 182, 183, 320; 74/89.17, 422

[56] References Cited

U.S. PATENT DOCUMENTS

| | | | |
|---|---|---|---|
| 2,958,263 | 11/1960 | Palkowski | 74/89.17 |
| 3,186,602 | 6/1965 | Ricciardi | 366/320 |
| 3,583,679 | 6/1971 | Godley, II | 366/76 |
| 3,645,505 | 2/1972 | McLeod, Jr. et al. | 366/177 |
| 3,776,525 | 12/1973 | Warner | 366/76 |
| 3,865,355 | 2/1975 | Eau Claire | 366/76 |
| 4,087,079 | 5/1978 | Kramer | 366/131 |
| 4,108,334 | 8/1978 | Moller | 222/136 |
| 4,108,337 | 8/1978 | Iijima | 222/194 |
| 4,148,100 | 4/1979 | Moller | 366/150 |

FOREIGN PATENT DOCUMENTS

| | | |
|---|---|---|
| 0006073 | 6/1978 | European Pat. Off. . |
| 7711367 | 11/1978 | France . |
| 7501407 | 2/1975 | Netherlands . |

Primary Examiner—Abraham Hershkovitz
Assistant Examiner—John T. Kwon
Attorney, Agent, or Firm—Renner, Otto, Boisselle & Lyon

[57] ABSTRACT

The invention relates to a head attachment for a hydraulic synthetic-resin processing machine for colored synthetic resin, the attachment comprising a mixer, a synthetic resin supply vessel directly connected with the former and a coloring mass supply vessel connected herewith through a dosing device, which device is provided with a hydraulic motor for driving the dosing device.

20 Claims, 10 Drawing Figures

HEAD ATTACHMENT FOR A HYDRAULIC SYNTHETIC-RESIN WORKING MACHINE FOR COLORED SYNTHETIC RESIN

The invention relates to a head attachment for a hydraulic synthetic-resin processing machine for coloured synthetic resin, said attachment comprising a mixer, a synthetic resin supply vessel directly connected with the former and a colouring mass supply vessel connected herewith through a dosing device.

Such a head attachment is known. A prior art head attachment comprises electric motors for driving the dosing device and the agitator forming part of the blender. The electric motors to be used are of a type that should have a very low speed and is, moreover, operating only for short intervals. Such electric motors usually have large dimensions, even if the head attachment proper need be proportioned for a very low capacity only. They impose serious limitations on size reduction of known head attachments. Furthermore such motors do not have a brake so that after switching off they run off in unchecked manner in dependence on speed and temperature as a result of which dosing is not accurate.

The conventional motors are controlled electronically. By means of reducing gear boxes their speed is reduced to the desired value. Both the electronic components and the gear boxes are sources of interferences. A problem involved in the connection of an electrically controlled apparatus with a hydraulic synthetic-resin working machine resides furthermore in that usually specific adaptations have to be made for coupling the control of the head attachment with the operation of the synthetic-resin processing machine. When using the known head attachment the homogenity of the resultant mixture leaves to be desired because mixing is inadequately intimate.

The known head attachment is solely intended for use with synthetic-resin processing machines having a horizontal spray head so that particular steps are required for adapting them to synthetic-processing machines having a vertical spray head.

The invention has for its object to provide a head attachment which is eminently suitable for a small-size structure. A further object of the invention is to provide a head attachment which can be coupled with an existing hydraulic machine without essential modification or adaptation of said machine.

A further object of the invention is to provide a head attachment which does not require additional energy, that is to say, it utilizes a temporary, as the case may be, periodical excess energy of the hyraulic machine.

The invention furthermore provides a head attachment which can be adapted in a very simple manner to the use of powder, grains or paste as a colouring mass.

A still further object of the invention is to provide a head attachment which ensures a highly homogeneous colouring of the synthetic resin.

The invention furthermore provides a head attachment which is suitable for use with synthetic-resin processing machines having a horizontal spray head as well as synthetic-resin processing machines having a vertical spray head.

With regard to the above-mentioned objects the invention provides a head attachment of the kind set forth in the preamble which comprises a hydraulic motor for driving the dosing device.

In a preferred embodiment the attachment comprises a rotatable conveying member which is coupled through a pinion and a toothed rack cooperating with the former with a hydraulic cylinder comprising a piston. This preferred embodiment is particularly intended for use with intermittently operating machines. For continuously operating machines a rotating hydraulic motor may be used.

When the colouring mass is formed by powder or grains the rotatable conveying member may be a worm without core journalled in a matching seat forming a separation between the colouring substance supply vessel and the mixer.

For the use of paste as a colouring substance the conveying member is preferably constructed in the form of a hose pump.

The agitator may be driven by a hydraulic motor and is preferably formed by at least two blade wheels, the blades of each of which alternately extend in opposite senses.

In a preferred embodiment the connecting manifolds of the mixer with the synthetic-resin supply vessel and the synthetic-resin processing machine are at an angle of about 45° to the axis of the opening between the dosing device and the mixer and extend in one or more planes transverse of the axis of the agitator.

Further features and particularities of the invention will be explained with reference to a drawing of a number of arbitrary embodiments.

Figure 3:
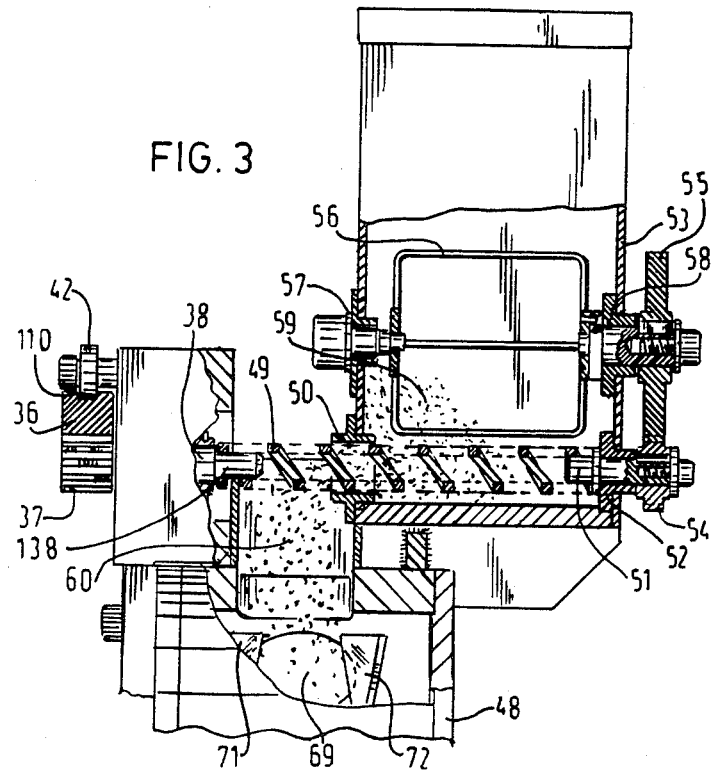
Figure 2:
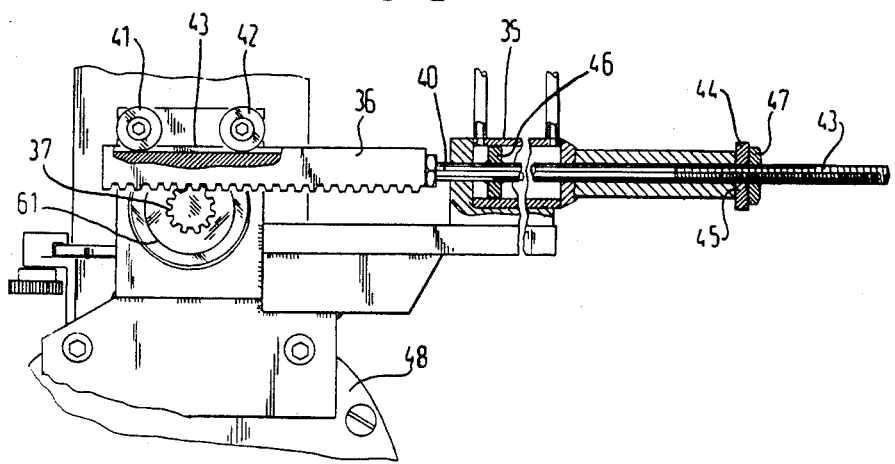
Figure 4:
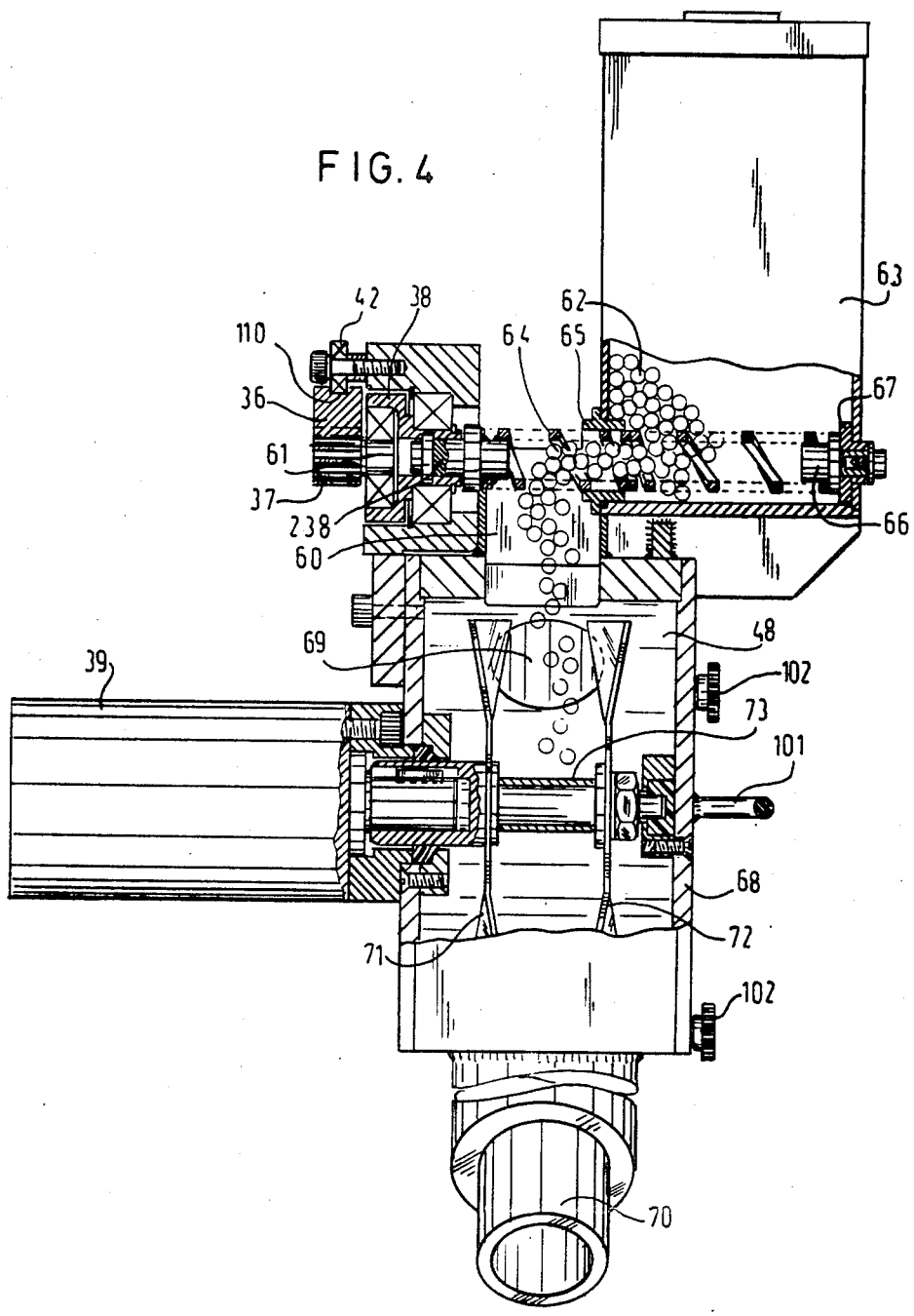
Figure 5:
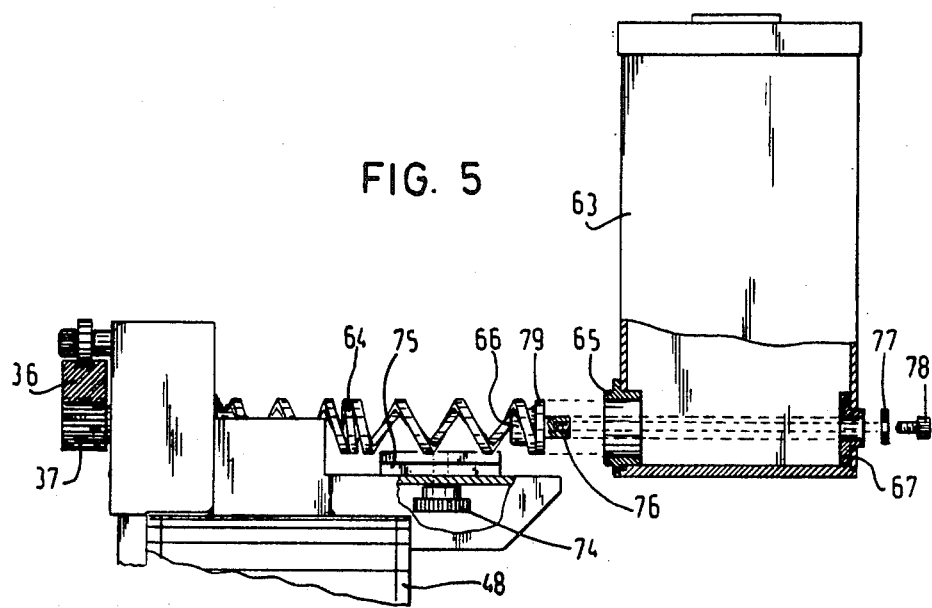
Figure 8:
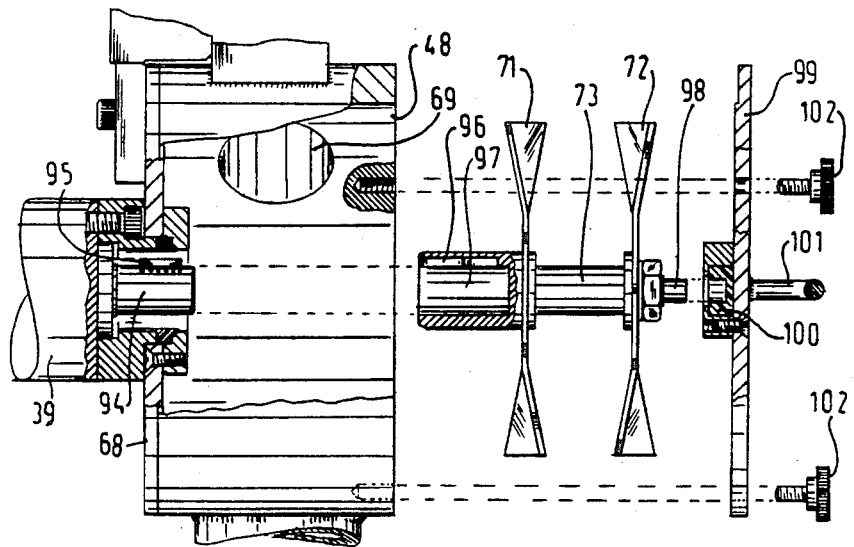
Figure 6:
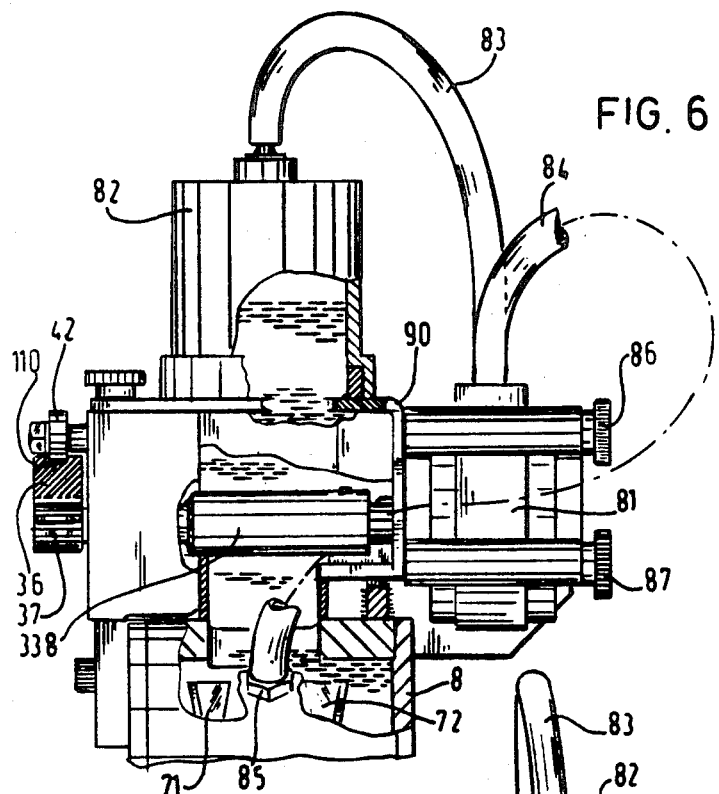
Figure 7:
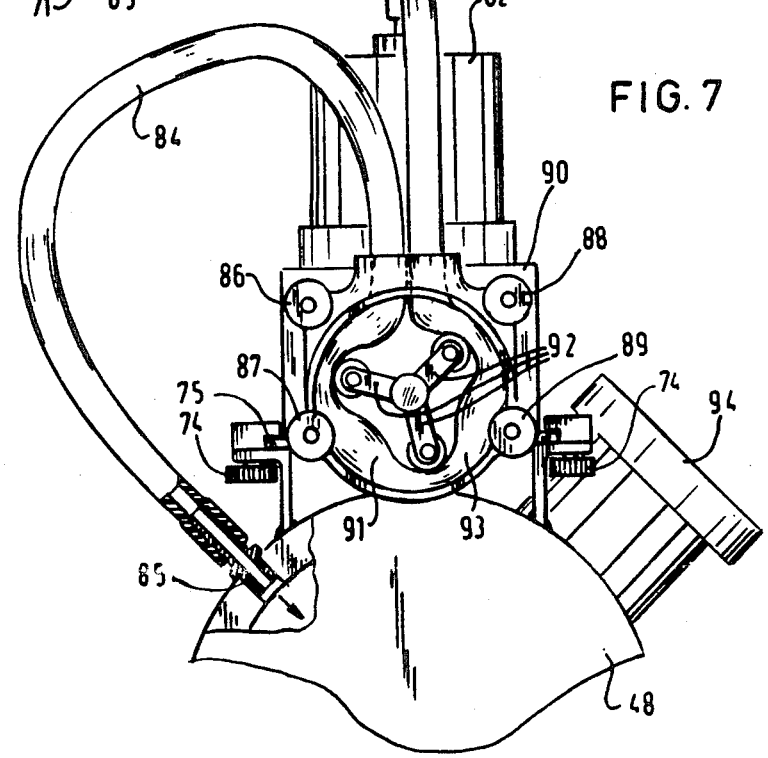
Figure 10:
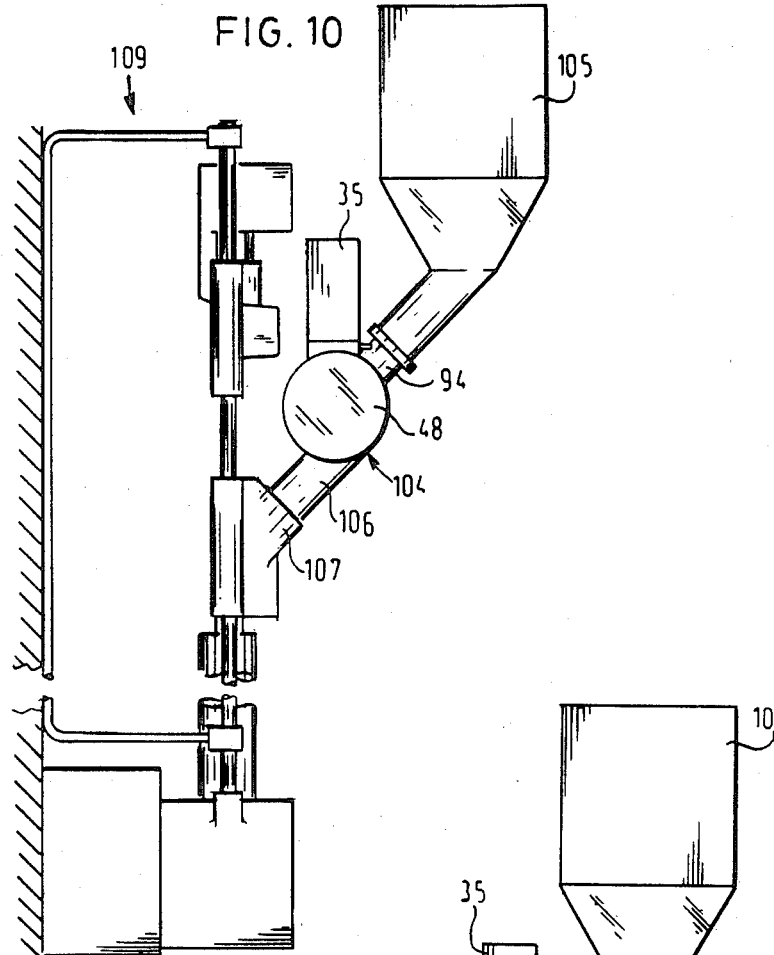
Figure 9:
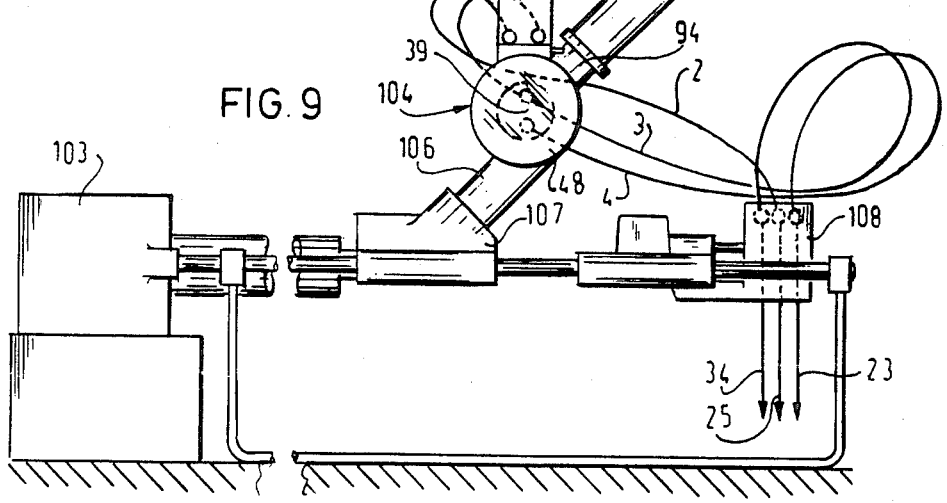

The drawing shows in:

FIG. 1 schematically a hydraulic, intermittently operating spray-casting machine having a head attachment embodying the invention;

FIG. 2 an elevational view, partly broken away, of a detail of the device of FIG. 1 for clarifying the hydraulic drive of the dosing device;

FIG. 3 a side elevation, partly broken away, of a detail of a head attachment embodying the invention, in which the colouring mass consists of powder;

FIG. 4 a side elevation, partly broken away, of a detail of a head attachment embodying the invention, in which the colouring mass consists of grains;

FIG. 5 a side elevation, partly broken away, of a detail of the head attachment of FIG. 4, in which the colouring grain supply vessel is shown in the dismounted state;

FIG. 6 a side elevation, partly broken away, of a detail of a head attachment embodying the invention, in which the colouring mass consists of a paste;

FIG. 7 a rear view of a detail of FIG. 6;

FIG. 8 a side elevation, partly broken away, of a mixer embodying the invention, in which for the sake of clarity the various parts are shown at relative distances;

FIG. 9 a schematic side elevation of a spray-casting machine having a horizontal spraying head provided with a head attachment embodying the invention; and FIG. 10 a schematic side elevation of a spray-casting machine having a vertical spraying head provided with a head attachment embodying the invention.

FIG. 1 shows a hydraulic spray-casting machine 1 outlined as a unit for the sake of clarity by a dot-and dash line. The spray-casting machine 1 is coupled through three flexible pressure conduits 2, 3, 4 with a head attachment 5 embodying the invention, which is outlined as a unit for the sake of clarity by a dot-and dash line. It should be noted that the scheme of FIG. 1 is drastically simplified and that only those parts are shown whose functions relate to the head attachment 5 in accordance with the invention.

Since the spray-casting machine 1 is of known type a succinct description may be sufficient.

A die unit 6 having an expulsion mechanism 7 is opened or closed through scissors 8, whose end remote from the die unit 6 is coupled with the frame of the machine 1 under the control of a hydraulic cylinder 10 with a plunger 11 governed by a controllable choke valve 9.

The die unit 6 is filled by means of a spraying head 12, the jacket of which is provided with heating means (not shown). The spraying head is hollow. In its interior it comprises a worm plunger 13 for feeding the desired amount of heated, coloured, pressurized synthetic resin to the spraying head 14. The means for feeding the coloured synthetic resin to the spraying head 12 are known and, therefore, not shown in the schematic illustration of FIG. 1.

Upon a relative displacement of the worm/plunger 13 towards the spray nozzle 14 the amount of synthetic resin located in front of the worm/plunger 13 is expelled. The required force is provided by two hydraulic rams 17, 18. Two further hydraulic rams 15, 16 serve for the displacement of the spraying head 12. The return movement of the worm/plunger 13 is accompanied by a concurrent rotation in the direction of the helical line under the action of a hydraulic motor 19, which conveys new synthetic resin into the free space in front of the worm/plunger 13.

The two hydraulic ducts towards and from the parallel connected hydraulic rams 15, 16 respectively include non-return valves 20, 21 and a control-valve 22. The feeding duct of the hydraulic motor 19 includes a choke valve 23. The inlet and outlet ducts of the parallel connected hydraulic rams 17, 18 are provided with excess pressure valves 24, 25. The control of, respectively, the hydraulic rams 15, 16, the hydraulic motor 19 and the hydraulic rams 17, 18 takes place through electromagnetically coupled and actuated hydraulic control-slides 26, 27, 28. The fluid feed duct of the control-slide 26 includes an adjustable excess pressure valve 29.

The hydraulic pressure source of the spray-casting machine 1 comprises a fluid reservoir 30, a pump 32 driven by a motor 31 and two fluid filters 33 and 34.

The head attachment according to the invention, outlined in FIG. 1 at the top comprises a hydraulic ram 35, the plunger of which is provided with a toothed rack 36, which cooperates with a pinion 37, which is rigidly coupled in one direction with a driving member 38 for actuating a dosing device according to the invention, to be described hereinafter. The head attachment 5 furthermore comprises a hydraulic motor 39 for driving the agitator of the mixer, which will be described hereinafter.

It should be noted that the head attachment 5 is coupled by only three flexible pressure ducts 2, 3, 4 with the existing hydraulic system. It will, therefore, be obvious that the spray-casting machine 1 can be adapted to the use of the head attachment 5 without the need for specific adaptations.

It will be apparent from the scheme of FIG. 1 that the drive of the driving shaft of the dosing device by means of the hydraulic ram 35 takes place by actuating the control-slide 28 for the dosing stroke and the control-slide 27 for the return stroke, whilst the energization of the hydraulic motor 39 for the mixer is coupled with that of the hydraulic motor 19 for the rotary drive of the worm/plunger 13. By this mode of coupling it is achieved that dosing of the colouring substance takes place independently of the setting of the valve 23, whilst the time for which and the rate at which the agitator of the mixer is operative are related to the rotary speed of the worm/plunger 13.

From the foregoing it will be obvious that during the rotation and the relative return run of the worm/plunger 13 colouring substance is mixed with non-coloured synthetic resin, after which the coloured synthetic resin is fed to the spray nozzle 12. At the same time the ram 35 resumes its starting position.

It is clearly evident from the scheme of FIG. 1 that the head attachment 5 according to the invention can be connected in a very simple manner by means of only three flexible ducts with existing hydraulic ducts. The sole modification of the existing spray-casting machine required thereto is the provision of additional connections for the existing ducts.

It is important that the energization of the active elements 35 and 39 of the head attachment 5 takes place in a period in which a high energy surplus is available in the spray-casting machine 1 because only the hydraulic rams 17, 18 and the hydraulic motor 19 are energized. If during this period the head attachment were not connected, the excess oil returns unused to the stock vessel or the oil reservoir 30. The energy involved can be considered as a loss. According to the invention this energy is utilized for the energization of the active elements of the head attachment 5 embodying the invention exactly at the correct instant in synchronism with the machine 1.

FIG. 2 is an elevational view, partly broken away, of a structural detail of the head attachment 5 shown schematically in FIG. 1. In this figure and the further figures all corresponding elements are designated by the same reference numerals.

The piston rod 40 of the hydraulic ram 35 drives the pinion 37 via the toothed rack 36. The toothed rack is guided at its top surface by two guide rollers 41, 42 cooperating with the bottom of an elongate slot 110 in the top surface of the toothed rack 36.

The stroke of the plunger 40 is adjustable because at the end remote from the toothed rack 36 the plunger is provided with screwthread 43, along which a set nut 44 is axially displaceable by turning it. This set nut 44 cooperates with an outer end surface 45 of the hydraulic ram 35 serving as a stop. It will be obvious that in the situation illustrated the piston 46 and hence the piston rod 40 are in their extreme left-hand positions determined by the axial disposition of the dosing set nut 44 with respect to the screwthread 43. Consequently from the extreme right-hand position the piston 46 has not been displaced for the full stroke rather for only part thereof. The setting of the nut 44 may be empirically determined by comparing the resultant colouring of the finished products with the desired extent of colouring. For fixing the axial position of the nut 44 a guard nut 47 is provided, which is tightened with some effort against the set nut 44.

The energizing unit for the dosing device described above is fastened by screw joints to the mixer 48 to be described hereinafter. It will be obvious, however, that other dispositions or other modes of fastening can be employed.

FIG. 3 is a side elevation, partly broken away, of a detail of a head attachment embodying the invention, in which the colouring mass is formed by powder. This elevation corresponds with the right-hand side elevation of the detail shown in FIG. 2. FIG. 3, however, shows further details of the operation of the dosing device according to the invention.

In the embodiment shown in FIG. 3 the transport is performed by a conveying member formed by a worm 49 of substantially constant pitch and without core and journalled in a matching seat 50. The worm 49 is driven by the shaft 138. This shaft 138 is coupled with the driving member 38 constructed in the form of a sleeve by means of a pin/slot joint. The other end of the worm rigidly surrounds a shaft 51 journalled in a bearing 52 and provided with a gear wheel 54 at the end emerging from a supply vessel 53. This gear wheel 54 cooperates with a gear wheel 55, which is coupled for its drive with a release member 56 for the colouring powder. This release member 56 is constructed in the form of a wire frame arranged on both sides on the walls of the vessel 53 in bearings 57, 58. It will be obvious that the rotation of the wire frame 56 is coupled with the rotation of the worm 49.

The vessel 53 contains colouring powder 59, which is passed in desired batches through the toner supply opening 60 of the mixer 48 under the action of a rotation of the worm 49 and hence by an apparent, axial displacement of the turns thereof.

Referring to the effect of the worm 49 without core it is noted that the colouring powder located in the cylindrical region bounded by the worm is gradually shifted by the rotation of the worm 49 towards the toner supply opening 60 under the action of gravity exerted on the toner mass 59 in the vessel 53.

After the foregoing it will be obvious that the worm has to rotate invariably in the same sense. For this purpose the pinion 37 is coupled through a directional bearing 61 rather than directly with the driving shaft 38 of the dosing member 49. The conveyor worm 49 is only actuated at the outgoing stroke of the ram 35. At the return stroken of the ram 35 the conveyor worm stands still owing to the free running in the pinion 37.

By manipulating the set nut 44 the amount of toner dispensed by the pressing stroke of the hydraulic ram 35 can be varied within very wide limits. The detail of FIG. 2 is discussed here in particular in connection with FIG. 3. It should be noted, however, that the assembly of FIG. 2 may be used not only for dosing powder, but also for dosing grains and paste. The latter can be performed by means of the devices according to the invention to be described hereinafter.

FIG. 4 is a side elevation, partly broken away, of a detail of a head attachment designed for mixing a synthetic resin with thoroughly coloured synthetic resin grains or "master batch".

The colouring grains 62 are contained in a supply vessel 63. The conveying member 64 is formed by a core-free worm journalled in a matching seat 65. At the input side of the seat the turns of the core-free worm 64 are substantially adjacent one another, since it has been found that in the transport of colouring grains with the use of the dosing member 49 of FIG. 3 the grains may be jammed between the turns of the worm and the inlet rim of the seat 50. This risk is completely eliminated in the embodiment of FIG. 4.

At one side the worm 64 is supported by a shaft 238, which is coupled with the driving member 38 and is journalled through a shaft 66 at its other end in a bearing 67. For dosing grains a release element such as the wire frame 56 of FIG. 3 is not required.

By the rotation of the worm 64 toner grains are admitted through the toner supply opening 60 into the interior of the mixer 48. In this embodiment the mixer 48 is constructed in the form of a cylindrical housing 68 having a toner inlet opening 60, an inlet opening 69 for non-coloured synthetic resin and an outlet stub 70 for coloured synthetic resin. The cavity of the housing 68 accommodates two blade wheels 71, 72, which are driven through an agitator shaft 73 by the hydro-motor 39. Further details of the mixer 48 will be discussed hereinafter with reference to FIG. 8.

FIG. 5 is a side elevation, partly broken away, of a detail of the head attachment of FIG. 4, the synthetic grain supply vessel being shown in the dismounted state. From this figure it will be apparent that with the aid of the locking element 75 fixable by means of the screw 74 the vessel 63 can be readily slid in the longitudinal direction of the worm 64, fixed and released. With this readily dismountable structure the head attachment according to the invention can be readily cleaned, whilst moreover the supply vessel 63 can be replaced within a short period of time.

A narrowed portion 76 of the shaft 66 is journalled in the bearing 67. Through a ring 77 a screw 78 serves for axially guarding the shaft 66 against rotation in one direction. A second ring 79 at the other side of the bearing 67 serves as a second axial stop member so that a complete, axial safeguard is obtained.

FIG. 6 is a side elevation, partly broken away, of a detail of a head attachment designed for mixing non-coloured synthetic resin with toner paste. Like in the preceding embodiments dosing takes place by driving a shaft 338 through the driving member 38 (not shown). In the present case the shaft 338 serves to drive hose pump 81. This rotatably drivable hose pump 81 is connected on the one hand through a hose 83 with a supply vessel 82 for the paste and on the other hand through a hose 84 with an inlet stub 85 opening out in the interior of the mixer 48.

The hose pump 81 is releasably fastened by screws 86, 87, 88, 89 to a frame 90, which is slid into the releasable locking elements 75 an it is fixed in place by the screws 74. The frame 90 supports furthermore the supply vessel 82.

From FIG. 7 it will be apparent that the hoses 83, 84 communicate with one another through the pump space 91. By the rotation of the shaft 338. The pump spokes 92 provided at their ends with rollers turn around so that the hose 93 located inside the pump space 91 is locally shut so that the paste is gradually pushed on in the non-closed cavities. FIG. 7 shows furthermore an inlet stub 94 for the non-coloured synthetic resin. The inlet stub will be discussed with reference to FIGS. 9 and 10.

FIG. 8 is a side elevation, partly broken away, of the mixer shown in FIG. 4. In this figure a few parts are shown at some distance from one another for the sake of clarity. FIG. 8 furthermore illustrates the manner of dismounting, for example, for cleaning the mixer. The shaft 94 of the hydro-motor 39 has a longitudinal key 95 cooperating with a key way 96 in a corresponding axial cavity 97 in the agitator shaft 73. The axial cavity 97 in the shaft 94 as well as the key way 96 and the key 95 have complementary shapes.

At the end remote from the hydro-motor a narrowed part 98 of the shaft 73 is journalled in a bearing 100 arranged on a head wall 99 of the mixer 48. The head wall 99 is provided with a handle 101 by means of which, after loosening the screws 102 the head wall 99 can be removed in an axial direction so that subsequently the agitator 71, 72, 73, 96, 97, 98 can also be removed. It will be obvious that remounting after cleaning is carried out in the reverse order. The blades of the blade wheels 71 and 72 are alternately directed in opposite senses.

FIG. 9 is a drastically simplified side elevation of a spray-casting machine 103 to which a head attachment 104 according to the invention is fastened. The head attachment 104 comprises a supply manifold 94, to which a supply vessel 105 for non-coloured synthetic resin (granulate) is fastened, and an outlet manifold 106 connected with an inlet manifold 107 of the spray-casting machine.

The head attachment 104 is connected in the manner shown in FIG. 9 by means of the three flexible ducts 2, 3, 4 with a connecting block 108 on the spray-casting machine. As is indicated, the hydraulic ducts 2, 3, 4 are connected with the excess pressure valve 25, the oil filter 34 and via the choke valve 23 with the control-slide 27 respectively (see also FIG. 1).

The connecting manifolds 94, 106 of the mixer 48 are at an angle of 45° to the axis of the opening between the dosing device and the mixer 48 and extend in a plane transverse of the axis of the agitator 71, 72, 73, 96, 97, 98.

FIG. 10 is a schematic side elevation of a spray-casting machine 109 having a vertical spraying head. Without further explanation a comparison of FIGS. 9 and 10 will show that by the above-described angles of 45° the head attachment embodying the invention can be employed without any modification in both positions for spray-casting machines.

The outlet manifold 106 may be at angles differing from 45°. For example, it may be adjoined at an angle of 90° to a synthetic resin processing machine having a horizontal spraying head. Said angle may even be adjustable.

The invention is not limited to the embodiments described above. Various modifications of component parts and their relationship may be applied without passing beyond the scope of the invention.

We claim:

1. A head attachment for a hydraulic, synthetic resin processing machine for colored synthetic resin, said attachment comprising a mixer, a synthetic resin supply vessel directly connected to said mixer, a coloring mass supply vessel connected to said mixer through a dosing device, and a reciprocating hydraulic motor and coupling for intermittently driving the dosing device upon stroking of the motor in one direction only.

2. A head attachment as claimed in claim 1, wherein said hydraulic motor includes a hydraulic cylinder with a pistion, and said dosing device includes a rotatable conveying member which is coupled to said hydraulic motor through a pinion and a toothed rack cooperating with said hydraulic cylinder and piston, said pinion being coupled to said rotatable conveying member by unidirectional coupling means whereby said rotatable conveying member is rotated in one diretion only.

3. A head attachment as claimed in claim 1 for use with coloring mass that is powdery or granular, wherein said rotatable conveying member is a core-free worm journalled on a matching seat at a place forming the separation between the coloring mass supply vessel and the mixer.

4. A head attachment as claimed in claim 3, for use with coloring mass that is a grunulate, wherein at and near the inlet end of the seat the turns of the core-free worm are adjacent or substantially adjacent one another.

5. A head attachment as claimed in claim 1, for use with coloring mass that is paste, wherein said conveying member is formed by a hose pump.

6. A head attachment as claimed in claim 1, wherein the mixer comprises an agitator rotatable about a shaft, and said agtitator is driven by hydraulic motor means and comprises at least two blade wheels, the blades of each of which are alternately directed in opposite senses.

7. A head attachment as claimed in claim 1, wherein said dosing device and mixer are connected by an opening therebetween, and the mixer is connected to the synthetic resin supply vessel by a connecting manifold which is at an angle of about 45° to the axis of the opening between the dosing device and the mixer and extends in a plane transverse of the axis of the agitator.

8. A head attachment as claimed in claim 7, in combination with a hydraulic, synthetic resin processing machine, wherein said mixer is connected to the synthetic resin processing machine by a connecting manifold which is at an angle of about 45° to the axis of the opening between the dosing device and the mixer and extends in a plane transverse of the axis of the agitator.

9. A head attachment as claimed in claim 7, in combination with a hydraulic, synthetic resin processing machine, wherein said mixer is connected to the synthetic resion processing machine by a connecting manifold which is at an adjustable angle to the axis of the opening between the dosing device and the mixer and extends in a plane transverse of the axis of the agitator.

10. A head attachment as claimed in claim 2, for use with coloring mass that is powdery or granular, wherein said rotatable conveying member is a core-free worm jornalled on a matching seat at a place forming the separation between the coloring mass supply vessel and the mixer.

11. A head attachment as claimed in claim 10, for use with coloring mass that is a granulate, wherein at and near the inlet end of the seat the turns of the core-free worm are adjacent or substantially adjacent one another.

12. A head attachment as claimed in claim 2, for use with coloring mass that is paste, wherein said conveying member is formed by a hose pump.

13. A head attachment as claimed in claim 2, wherein the mixer comprises an agitatior rotatable about a shaft, and said agitator is driven by hydraulic motor means and comprises at least two blade wheels, the blades of each of which are alternately directed in opposed senses.

14. A head attachment as claimed in claim 3, wherein the mixer comprises an agitatior rotatable about a shaft, and said agitator is driven by hydraulic motor means and comprises at least two blade wheels, the blades of each of which are alternately directed in opposite senses.

15. A head attachment as claimed in claim 4, wherein the mixer comprises an agitatior rotatable about a shaft, and said agitator is driven by hydraulic motor means and comprises at least two blade wheels, the blades of eah of which are alternately directed in opposite senses.

16. A head attachment as claimed in claim 5, wherein the mixer comprises an agitator rotatable about a shaft, and said agitator is driven by hydraulic motor means and comprises at least two blade wheels, the blades of each of which are alternately directed in opposite senses.

17. A head attachment as claimed in claim 2, wherein said dosing device and mixer are connected by an opening therebetween, and the mixer is connected to the synthetic resin supply vessel by a connecting manifold which is at an angle of about 45° to the axis of the opening between the dosing device and the mixer and extends in a plane transverse of the axis of the agitator.

18. A head attachment as claimed in claim 3, wherein said dosing device and mixer are connected by an opening therebetween and the mixer is connected to the synthetic resin supply vessel by a connecting manifold which is at an angle of about 45° to the axis of the opening between the dosing device and the mixer and extends in a plane transverse of the axis of the agitator.

19. A head attachment as claimed in claim 6, wherein said dosing device and mixer are connected by an opening therebetween, and the mixer is connected to the synthetic resin supply vessel by a connecting manifold which is at an angle of about 45° to the axis of the opening between the dosing device and the mixer and extends in a plane transverse of the axis of the agitator.

20. A head attahment as claimed in claim 1, including adjustable mechanical stop means for adjustably setting the stroke of said hydraulic motor in such one direction thereby corresponding to vary the extend of dosing.

* * * * *